Patented June 24, 1952

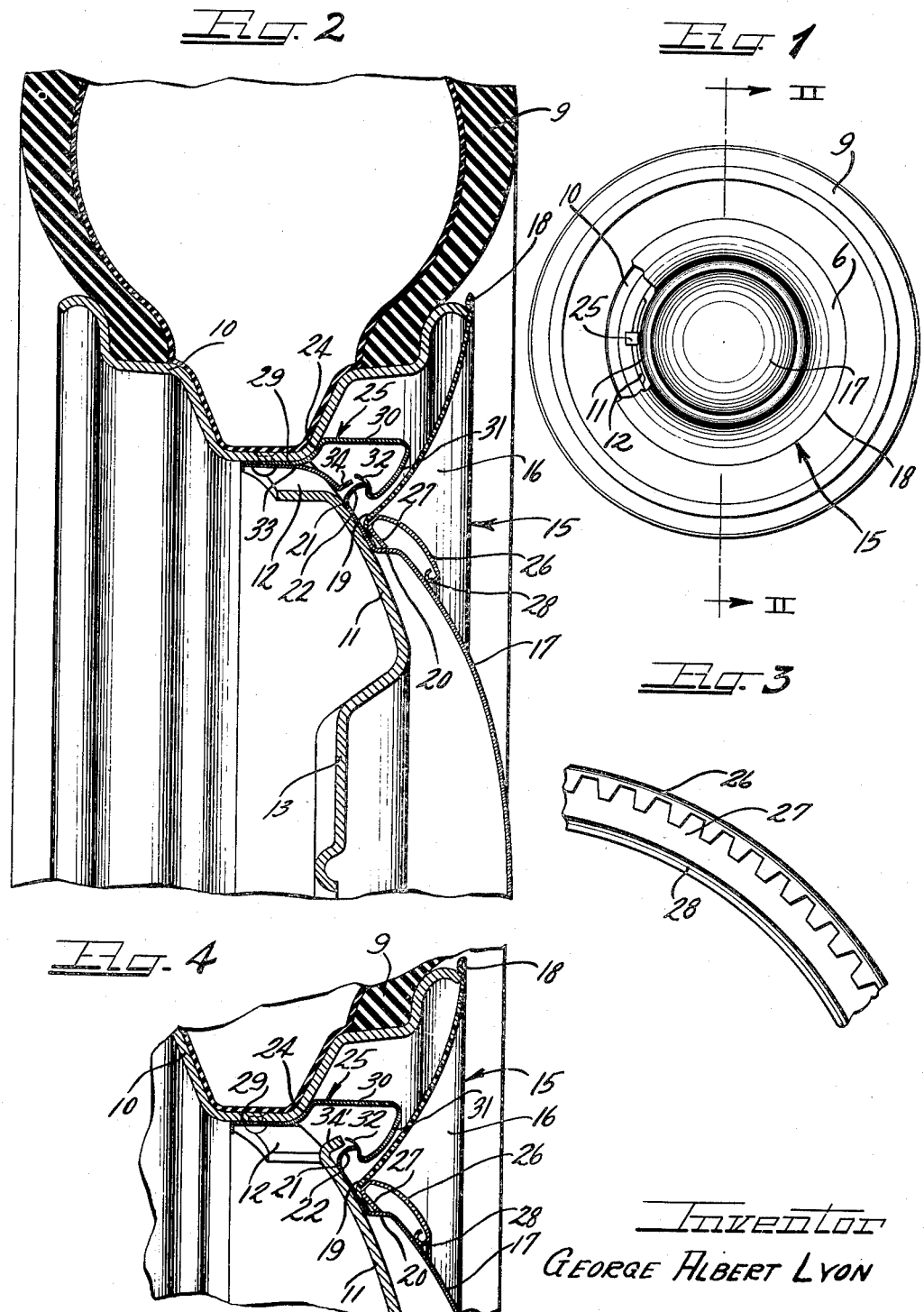

2,601,309

UNITED STATES PATENT OFFICE 2,601,309

WHEEL COVER

George Albert Lyon, Allenhurst, N. J.

Application February 9, 1946, Serial No. 646,637

10 Claims. (Cl. 301—37)

This invention relates to a wheel cover structure, and more particularly to novel retaining means for holding a cover on an automobile wheel.

An object of this invention is to provide improved retaining means for a cover which includes means for assisting in the centering of the cover on the wheel.

Another object of this invention is to provide in a cover and wheel assembly, including cover retaining spring clips, means cooperable with the spring clips to prevent the cover from overriding any one clip as it is pressed home into retaining cooperation with the spring clips.

Still another object of this invention is to provide a novel and simple cover structure with rigidified shoulder means for cooperation with retaining clips on a wheel.

In accordance with the general features of this invention, there is provided in a cover structure for a wheel including tire rim and body parts having projecting therefrom spring clips with turned free extremities for retaining cooperation with a cover, a circular cover for disposition on an outer side of the wheel and having a concealed shoulder adapted to be cammed over and behind the free extremities of the clips and means carried by the wheel and associated with the free extremities of the clips for assisting in centering the shoulder of the cover and also for preventing the shoulder from becoming cocked and riding beyond any one of the free extremities of the clips.

In accordance with other features of this invention, the centering means takes one of two forms, in one of which it comprises a spring finger attached to the wheel along with each clip and having a turned outer extremity; and in the other of which the centering means comprises a turned edge on the body part of the wheel cooperating with the free turned extremity of a clip to define a pocket in which the shoulder of the cover is adapted to be received.

Other objects and features of this invention will more fully appear from the following detail description taken in connection with the accompanying drawings which illustrate several embodiments thereof and in which Figure 1 is a side view of a cover and wheel assembly embodying the features of this invention and in which the cover is partly broken away to show the location of one of the spring clips in a wheel opening;

Figure 2 is an enlarged fragmentary cross-sectional view taken on substantially the line II—II of Figure 1 looking in the direction indicated by the arrows; and showing how my novel cover cooperates with the retaining and centering means on the wheel;

Figure 3 is a fragmentary detailed view, and more particularly a rear view of the annular bead employed for fastening the outer cover ring to the central circular cover member; and Figure 4 is a fragmentary sectional view similar to Figure 2, illustrating a modification of the invention with particular respect to the cover centering means cooperable with the spring clips on the wheel.

As shown on the drawings:

The reference character 9 designates generally a pneumatic tire and tube assembly mounted in the usual way upon a conventional drop center multi-flange tire rim, which is in turn carried by a load-bearing or body member 11. The body member 11 comprises a dished stamping and is attached at spaced intervals to the base flange of the rim so that there is provided a plurality of circumferentially spaced axially extending wheel openings 12. The center portion of the body part, as is conventional in wheel structures, is depressed and formed with a flange 13 adapted to be fastened in the usual manner by bolts or cap screws (not shown) to a part on an axle of the wheel.

Detachably associated with this conventional wheel structure is a tire cover assembly designated generally by the reference character 15 and which includes an outer annular ring 16 and a central circular member 17. The outer annular ring in this form of the invention as well as in the one shown in Figure 4, may be made of any suitable material although it particularly lends itself to manufacture from a resiliently pliable material, such as plastic. Excellent results may be obtained by making this ring from ethyl cellulose, cellulose acetate and vinyl resins.

The ring 16 has an outer turned edge 18 adapted to overhang an outer edge of the tire rim 10 in close proximity to an outer side wall of the tire. This ring is of a convex-concave cross sectional contour and extends radially and axially inwardly toward the body part 11. In fact, it is of such radial extent and curvature that in use it appears to constitute an extension of the side wall of the tire. This illusion may be accentuated by providing the ring 16 with a white external finish, in which event it will appear to constitute a white side wall part of the tire and in which the tire appears to extend clear down to the body part of the wheel. This enables the tire to have a massive appearance.

The radially inner margin of the outer ring 16 is turned at 19 so that this turned portion is adapted to rest against and abut an offset shoulder 20 formed on the central cover member 17. In fact, the central cover member 17 has a radial extension 21 beyond the shoulder 20, the radially outer end of which is formed into a turned edge or shoulder 22, cooperable with spring retaining clips 25 to be hereinafter described.

The turned margin 19 of the plastic cover 16 is held in place on the shoulder 20 by means of a snap-on annular metal bead 26. This bead 26 has a plurality of under-turned inclined biting fingers 27 adapted to be pressed into gripping engagement with the shoulder 20 and so as to press the turned portion 19 of the ring 16 against the radial extension 21 of the cover member 17. The inner edge of the bead 26 may be slightly turned as at 28 if the same is so desired.

This bead 26 may be made of any suitable sheet material although excellent results may be obtained by making it from stainless steel since stainless steel lends itself to a lustrous finish.

The central circular cover member 17 may likewise be made from any suitable sheet metal although it need not be made from as high grade a sheet steel as that comprising the bead 26.

In the assembly of the cover member 15 the ring 16 is first pressed over the shoulder 20 until it is seated on the member 17 and then the annular bead 26 is aligned with the shoulder 20 and is pressed axially home into retaining cooperation with the shoulder 20. In this manner the two parts 16 and 17 of the cover may be firmly connected together.

The spring clips 25 may be of any suitable number, such, for example, as three to five, depending upon the number of the wheel openings 12. Each clip 25 includes an axially rearwardly projecting portion extending into the wheel opening and suitably attached to one of the wheel parts, such, for example, as the tire rim part 10. Any suitable means may be employed for fastening this extension 29 to the part 10.

The outer portion of each of the clips 25 is formed into a bent loop 30 which abuts a side flange of the tire rim at 24 so as to limit the axial movement of the clip into the wheel opening 12. This turned or looped portion 30 includes a bent end 31 terminating in an angular turned extremity 32, which is under-turned and is adapted to be engaged by the turned shoulder 22 of the cover assembly 15.

Now in the mounting of the wheel cover 15 on the wheel, if the cover should be off center the turned edge or shoulder 22 thereof may override the extremity 32 of one of the clips and get in behind the clip. Therefore, it is desirable to provide some means for preventing this from happening and for insuring that the shoulder 22 will be properly centered with reference to the free extremities 32 of the spring clips.

I provide such a means in the form of spaced fingers 33 fastened along with the spring clips 25 to the base flange of the tire rim 10. There is one of these fingers for each of the spring clips. Each of these fingers has a turned extremity 34 located in close proximity to the turned extremity 32 of the spring clip and they cooperate with the turned extremities of the spring clips to define an annular pocket in which the turned shoulder 22 of the cover is received. This extremity 34 on the finger 33 serves as a positive stop or abutment for preventing the turned edge or shoulder 22 of the cover from being pressed too far in behind the turned end 32 of any particular clip.

In the application of the cover to the wheel, it is first pressed over an outer side of the wheel with its turned edge 22 engaging the spring clips 25. Thereafter it is pressed axially toward the body part 11 so that the turned edge 22 cams the resilient clips outwardly placing them under tension. This results in the turned edge 22 snapping over the hump on the clips and into engagement with the turned rear extremities 32 of the clips. The diameter of the edge 32 is such that the spring clips cannot return to their normal positions when they are in engagement therewith and hence they are under tension. This enables the clip to exert a pressure against the turned edge 22 for the purpose of tightly clamping the same against the body part 11 and in that manner retains the cover on the wheel.

Of course, it will be clear form what has been said before that in this application of the cover the fingers 33 and more particularly their turned ends 34 assist in centering the shoulder 22 with reference to the extremities of the clips and prevents the shoulder 22 from being pressed beyond any particular turned extremity 32.

Removal of the cover may be easily effected by flexing the plastic ring 16 and inserting a pry-off tool or screw driver therebehind for the purpose of engaging the shoulder 22 between the clips and in that manner the cover can be forcibly pried free of its retaining cooperation with the clips.

In Figure 4 I have illustrated a modification of the invention wherein the same numerals are employed to designate parts common to both Figures 2 and 4. It will be noted that the parts of the wheel and the cover parts are identical to those of Figure 2 with the exception that the fingers 33 are omitted and instead portions 34' of the body part 11 are punched out of the body part at the opening 12 to form turned edges. These turned edges 34' take the place of the turned edges 34 in Figure 2, but serve the same purpose as the turned edges 34 of Figure 2. With this exception the structure and operation of the Figure 4 modification is the same as that of the Figure 2 modification.

I claim as my invention:

1. In a cover structure for a wheel including tire rim and body parts, a circular cover for disposition on an outer side of the wheel having a shoulder, and cover retaining means normally concealed by the cover and cooperable with said shoulder, said means including a plurality of spring clips and connected to one of said body parts and each including a turned free extremity yieldably deflectable by pressure thereagainst of said shoulder so that said shoulder may be cammed over and behind an edge of said free extremity, said retaining means also including a turned edge extending opposite to and being disposed adjacent the edge of each spring clip for assisting in centering the shoulder of the cover on the wheel and for preventing the shoulder from over-riding the extremity of the turned edge of each of the clips, said cover including an outer annular ring connected at its inner margin to a central circular member and said central circular member having a portion extending rearwardly behind said outer ring and formed into said shoulder cooperable with the cover retaining spring clips, said ring being attached to said central circular member by an annular snap on bead including under-turned fingers for gripping a portion of the central circular member and for bearing against a radially inner margin of said ring.

2. In a cover-retaining structure for a wheel including tire rim and body parts, one of which carries a plurality of cover retaining spring clips for a circular cover for disposition over said wheel and detachably cooperable with said spring clips, means associated with said spring clips comprising a turned edge adjacent the free extremity of each of the clips for preventing a portion of the cover from riding over and beyond the extremity when the cover is pressed into cooperation with the clips, said turned edge being formed on a separate finger attached to the wheel in face-to-face relation with an associated spring clip and projecting axially outwardly in spaced relation to the cover-engaging portion of the clip.

3. In a cover structure for a wheel including tire rim and body parts, one of which carries a plurality of cover retaining spring clips and a circular cover for disposition over said wheel and detachably cooperable with said spring clips, means associated with said spring clips comprising a turned edge adjacent the free extremity of each of the clips for preventing a portion of a cover from riding over and beyond the extremity when the cover is pressed into cooperation with the clips, said turned edge comprising a flange portion on the body part turned generally radially and axially outwardly to a position in close proximity to a free extremity of an associated spring clip.

4. In a cover-retaining structure for a wheel including tire rim and body parts, one of which has attached thereto a plurality of cover retaining spring clips for a circular cover for disposition on an outer side of the wheel and having a shoulder detachably engageable with the free extremities of said clips, and abutment means associated with the free extremities of the clips to define an annular pocket in which said cover shoulder is adapted to be received and for preventing said shoulder from over-riding the free extremities of the clips as the cover is pressed into retaining cooperation with the clips, said abutment means comprising a plurality of separate fingers each being attached to the wheel along with and superposed upon a spring clip and having a turned extremity adjacent that of the associated clip.

5. A wheel structure including tire rim and body parts with wheel openings between the parts, and means for retaining a wheel cover on the outer side of the wheel including a clip secured to the tire rim in each opening and extending axially outwardly from the tire rim beyond the opening and having a free resilient cover engaging terminal portion turned generally radially and axially inwardly and formed with a generally radially outwardly extending underturned terminal of generally concave longitudinal cross-section to engage an outturned edge on the cover for normally retaining the cover substantially centered, said means also including a portion associated with each of the clips at the radially inner or body side of the wheel opening adjacent the radially outer extremity of said underturned clip terminal and providing a flange extending generally axially outwardly between the body and the flexible cover engaging portion of the clip to delimit radial disposition of the cover and prevent the cover from over-riding the terminal portion of any one of the clips.

6. A wheel structure including tire rim and body parts with wheel openings between the parts, and means for retaining a wheel cover on the outer side of the wheel including a clip secured to the tire rim in each opening and extending axially outwardly from the tire rim beyond the opening and having a free resilient cover engaging terminal portion turned generally radially and axially inwardly, said means also including a portion associated with each of the clips at the radially inner or body side of the wheel opening and providing a flange extending generally axially between the body and the flexible cover engaging portion of the clip to delimit radial disposition of the cover and prevent the cover from over-riding any one of the clips, said delimiting flange means comprising a separately formed finger secured to the tire rim in superposed relation with the clip in each instance and extending across the wheel opening to the specified operative relationship to the flexible cover engaging terminal portion of the clip.

7. A wheel structure including tire rim and body parts with wheel openings between the parts, and means for retaining a wheel cover on the outer side of the wheel including a clip secured to the tire rim in each opening and extending axially outwardly from the tire rim beyond the opening and having a free resilient cover engaging terminal portion turned generally radially and axially inwardly, said means also including a portion associated with each of the clips at the radially inner or body side of the wheel opening and providing a flange extending generally axially between the body and the flexible cover engaging portion of the clip to delimit radial disposition of the cover and prevent the cover from over-riding any one of the clips, said delimiting flange in each instance comprising an integral portion of the wheel body turned generally axially outwardly at the wheel opening into the cooperative relationship with the clip.

8. In a cover structure for disposition on the outer side of a vehicle wheel, a trim ring member adapted for concealing the outer side of a tire rim and having an inner marginal generally radially inwardly and axially outwardly extending flange, an inner circular cover member having a marginal groove opening generally axially outwardly and having the inner marginal flange of the trim ring seated therein, said groove being defined at the radially inner side thereof by a generally radially outwardly facing shoulder, a retaining bead member of a radial expanse to straddle said shoulder and the adjacent radially inner portion of the inner circular cover member and having an underturned edge formation retainingly engaging the shoulder and clamping said inner marginal flange of the trim ring into said outer marginal groove of the inner cover member, the radially outer extremity of the inner cover member margin extending generally radially outwardly beyond the junction of the trim ring therewith and having a flange formation extending generally axially and radially outwardly and adapted for engagement by retaining clip structure carried by the wheel concealed by the trim ring cover member.

9. In a wheel structure including tire rim and body portions, a cover for disposition at the outer side of the wheel and including a generally axially outwardly extending flange, retaining clips carried by one of said wheel portions comprising generally axially outwardly extending spring loops projecting axially outwardly beyond said cover flange and having respective underturned terminal flanges of concave formation in longitudinal cross-section and engaging against the axially outwardly projecting edge of said flange, and substantially retaining the cover in place on the wheel and generally centered on the wheel, and a plurality of finger-like elements carried fixedly by one of the wheel parts and projecting generally axially outwardly adjacent to said cover flange to cooperate with the clips in assuring a centered position of the cover on the wheel.

10. In a wheel structure including tire rim and body portions, a cover at the outer side of the wheel including a central circular member and a trim ring member, the trim ring member and the central circular member being secured together radially inwardly from the margin of the central circular member, said margin of the central circular member engaging the wheel body adjacent to the tire rim and comprising a generally axially outwardly turned flange, a series of retaining clips carried by the tire rim and having spring loop portions concealed behind the trim ring member and including terminal flanges extending generally radially outwardly and of concave longitudinal cross-section resting upon said marginal flange and holding the same against the wheel body and due to the concavity of the retaining terminal flanges retaining the flange and thereby the cover substantially centered on the wheel, and a plurality of finger-like elements carried fixedly by one of the wheel parts and projecting generally axially outwardly adjacent to the radially outer side of said cover flange in cooperation with the clips for assuring a centered position of the cover on the wheel.

GEORGE ALBERT LYON.

REFERENCES CITED

The following references are of record in the file of this patent:

UNITED STATES PATENTS

| Number | Name | Date |
|---|---|---|
| Re. 22,119 | Lyon | June 16, 1942 |
| 2,198,057 | Lyon | Apr. 23, 1940 |
| 2,239,367 | Lyon | Apr. 22, 1941 |
| 2,368,248 | Lyon | Jan. 30, 1945 |